(12) United States Patent
Oh

(10) Patent No.: US 8,851,538 B2
(45) Date of Patent: Oct. 7, 2014

(54) BUMPER RAIL FOR VEHICLE

(71) Applicant: Hyundai Motor Company, Seoul (KR)

(72) Inventor: Hee Dae Oh, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/791,162

(22) Filed: Mar. 8, 2013

(65) Prior Publication Data

US 2014/0138985 A1    May 22, 2014

(30) Foreign Application Priority Data

Nov. 20, 2012 (KR) .......................... 10-2012-0131325

(51) Int. Cl.
*B60R 19/02* (2006.01)
*B60R 19/18* (2006.01)

(52) U.S. Cl.
CPC ..................................... *B60R 19/18* (2013.01)
USPC ....................................................... 293/102

(58) Field of Classification Search
CPC ............... B62D 25/084; B62D 21/152; A63D 2005/003; B60R 19/34; B60R 19/18; B60R 19/24; B60R 2019/1813
USPC ......... 293/102, 133, 155, 117, 120, 121, 126, 293/132, 136; 224/924; 296/187.09, 296/193.09, 203.02
See application file for complete search history.

(56) References Cited

U.S. PATENT DOCUMENTS

| | | | | |
|---|---|---|---|---|
| 4,457,547 A | * | 7/1984 | Sekiyama et al. | ............. 293/110 |
| 4,818,006 A | * | 4/1989 | Arndt | ............... 296/32 |
| 5,340,178 A | * | 8/1994 | Stewart et al. | ................ 293/122 |
| 5,658,027 A | * | 8/1997 | Eissinger et al. | ............. 293/120 |
| 5,951,097 A | * | 9/1999 | Esposito et al. | ......... 296/187.09 |
| 6,000,738 A | * | 12/1999 | Stewart et al. | ................ 293/102 |
| 6,141,935 A | * | 11/2000 | Artner et al. | ..................... 52/843 |
| 6,217,089 B1 | * | 4/2001 | Goto et al. | ..................... 293/102 |
| 6,412,836 B1 | * | 7/2002 | Mansoor et al. | ............. 293/132 |
| 6,485,072 B1 | * | 11/2002 | Werner et al. | ................ 293/132 |
| 6,533,251 B1 | * | 3/2003 | Abbaticchio | ............... 256/65.15 |
| 6,592,158 B2 | * | 7/2003 | Kettler et al. | ................ 293/120 |
| 6,726,259 B2 | * | 4/2004 | Kettler et al. | ................ 293/102 |
| 6,918,621 B2 | * | 7/2005 | Seksaria | ....................... 293/133 |
| 7,007,989 B2 | * | 3/2006 | Yoon | ............................. 293/120 |
| 7,044,516 B2 | * | 5/2006 | Kobayashi et al. | .......... 293/146 |
| 7,163,241 B2 | * | 1/2007 | Liu et al. | ....................... 293/102 |
| 7,287,788 B2 | * | 10/2007 | Caliskan et al. | ............. 293/102 |
| 7,413,227 B2 | * | 8/2008 | Straughn | ....................... 293/135 |

(Continued)

FOREIGN PATENT DOCUMENTS

| | | |
|---|---|---|
| JP | 11-091466 A | 4/1999 |
| JP | 2002-264740 A | 9/2002 |

(Continued)

*Primary Examiner* — Kiran B Patel

(74) *Attorney, Agent, or Firm* — Morgan, Lewis & Bockius LLP

(57) ABSTRACT

A bumper rail assembled into a bumper of a vehicle includes a bumper rail, a reinforcing member, and a forming part. A bumper rail is disposed at front. The reinforcing member is disposed at the rear side of the bumper rail and forming a closed section together with the bumper rail. The forming part is integrally formed at an inner side of the bumper rail and is disposed parallel along the longitudinal direction of the bumper rail to increase a stiffness of the bumper rail, the forming part having a pipe shape.

8 Claims, 2 Drawing Sheets

(56) References Cited

U.S. PATENT DOCUMENTS

| | | | |
|---|---|---|---|
| 8,360,490 B2* | 1/2013 | Handing et al. | 293/120 |
| 8,444,211 B2* | 5/2013 | Fujita | 296/187.05 |
| 8,622,465 B2* | 1/2014 | Fujita | 296/193.06 |
| 2002/0149214 A1* | 10/2002 | Evans | 293/120 |
| 2003/0025359 A1* | 2/2003 | Takahashi et al. | 296/203.02 |
| 2003/0047952 A1* | 3/2003 | Trappe | 293/120 |
| 2003/0227182 A1* | 12/2003 | Yoshida et al. | 293/102 |
| 2004/0094975 A1* | 5/2004 | Shuler et al. | 293/120 |
| 2005/0029821 A1* | 2/2005 | Evans | 293/133 |
| 2005/0052036 A1* | 3/2005 | Gioia et al. | 293/102 |
| 2006/0022472 A1* | 2/2006 | Omura et al. | 293/120 |
| 2006/0145491 A1* | 7/2006 | Shuler et al. | 293/120 |
| 2008/0042454 A1* | 2/2008 | Garnweidner | 293/132 |
| 2013/0175813 A1* | 7/2013 | Mana et al. | 293/120 |

FOREIGN PATENT DOCUMENTS

| | | |
|---|---|---|
| JP | 2010-149174 A | 7/2010 |
| KR | 10-2001-0038846 A | 5/2001 |
| KR | 1020100131817 | 12/2010 |
| KR | 1020110122597 | 11/2011 |

* cited by examiner

BUMPER RAIL FOR VEHICLE

CROSS-REFERENCE TO RELATED APPLICATION

The present application claims priority of Korean Patent Application Number 10-2012-0131325 filed Nov. 20, 2012, the entire contents of which application is incorporated herein for all purposes by this reference.

BACKGROUND OF INVENTION

1. Field of Invention

The present invention relates to a bumper rail for a vehicle. More particularly, the present invention relates to a bumper rail for a vehicle, which is assembled into the front bumper of the vehicle to increase stiffness.

2. Background Art

Generally, vehicle bumpers are installed both at the front and rear ends of the vehicle to protect a vehicle body, and absorb an impact to protect occupants at the time of vehicle collision.

Bumpers disposed at the front side of the vehicle body have a structure in which a bumper cover, an impact-absorbing foam, and a bumper rail are sequentially arranged, and perform a function of mitigating impact energy from the front impact of vehicles.

For example, the bumpers of vehicles are disposed at the front side of the vehicle body include a bumper cover having a C-shaped section and formed of a plastic material, an impact-absorbing foam disposed at the inner side of the bumper cover to absorb impact energy, and a bumper rail disposed at the rear side of the impact-absorbing foam.

Particularly, the bumper rail serves to absorb most impact energy from the front side of vehicles while having a rectangular shape of closed section.

The bumper rails are usually manufactured by roll-forming hot rolled steel sheets.

FIGS. 1A and 1B are a perspective view and a cross-sectional view, respectively, illustrating a typical bumper rail of a vehicle.

As shown in FIGS. 1A and 1B, a bumper rail 10 is formed of a panel member having a C-shaped section, and is coupled with a reinforcing member 11 at the rear side thereof to form a closed section together with the reinforcing member 11.

Recently, the section of the bumper rail is being reinforced with an SPTD 1,470 class pipe 12 to enhance its stiffness in preparation for low-speed crash and offset crash of a vehicle.

The bumper rail 10 and the pipe 12 are $CO_2$-welded, and then the reinforcing member 11 is spot-welded to from a bumper rail in which the pipe 12 and the reinforcing member 11 are integrally formed.

Here, a method of reinforcing a bumper rail with a pipe is more advantageous in terms of effect and weight than a method of increasing the thickness of the bumper rail and the reinforcing member.

However, a typical bumper rail structure has the following limitations.

First, since the bumper rail has a structure that is welded with an additional pipe, it is disadvantageous in terms of weight and incurs a cost increase.

Second, since the bumper rail and the pipe have to be $CO_2$-welded at about 20 points, the cost increases, and a separate assembly jig is needed.

On the other hand, as examples of methods of enhancing the stiffness of a bumper rail in preparation for the low-speed crash and the offset crash, Korean Patent Application Publication Nos. 2011-122597 and 2010-131817 and Japanese Patent Application Publication Nos. 2002-264740 and 1999-91466 disclose methods of enhancing the stiffness by modifying the sectional shape of the bumper rail.

However, these methods have limitations in that the structure is complicated and the size is disadvantageous in terms of space utilization. Also, when considering the combination relation with peripheral components, since the whole layout needs to be changed, the efficiency is reduced in terms of actual application.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a bumper rail for a vehicle, which can reduce cost and weight while maintaining the same stiffness as existing pipe welding type, by integrally forming a forming part of a pipe shape at the rear side of the bumper rail and allowing the forming part to show a stiffness equal to that of a typical steel pipe welding type to achieve a new type of bumper rain reinforcement structure that can increase the stiffness of the bumper rail coping with the low-speed crash and the offset crash of vehicles.

In one aspect, the present invention provides a bumper rail assembled into a bumper of a vehicle, including: a bumper rail disposed at the front side of the bumper rail; a reinforcing member disposed at the rear side of the bumper rail and forming a closed section together with the bumper rail; and a forming part integrally formed at an inner side of the bumper rail and disposed parallel along the longitudinal direction of the bumper rail to increase a stiffness of the bumper rail, the forming part having a pipe shape.

The forming part having the pipe shape may integrally extend from a neck forming a gap in a vertical wall of the bumper rail 10, and may have a hollow therein.

The bumper rail for the vehicle may further include a plurality of joints formed at a certain interval along the gap in the vertical wall of the bumper rail.

The forming part having the pipe shape may be disposed along a center of the vertical wall of the bumper rail.

The forming part having the pipe shape may be disposed in plurality to further increase the stiffness of the bumper rail.

The present methods and apparatuses have other features and advantages apparent from the accompanying drawings, incorporated herein, and below Detailed Description, which together serve to explain certain principles of the present invention.

Figure 1A:
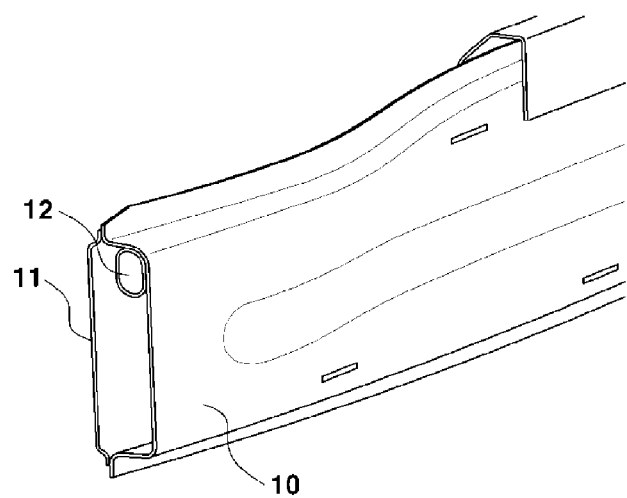
FIGS. 1A and 1B are a perspective view and a cross-sectional view, respectively, illustrating a typical bumper rail for a vehicle.
Figure 1B:
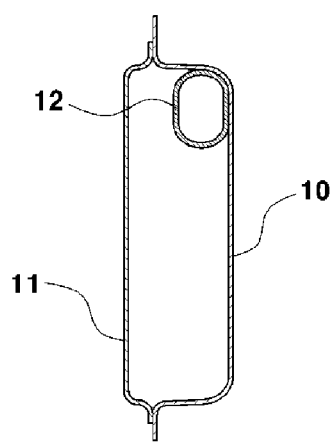

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
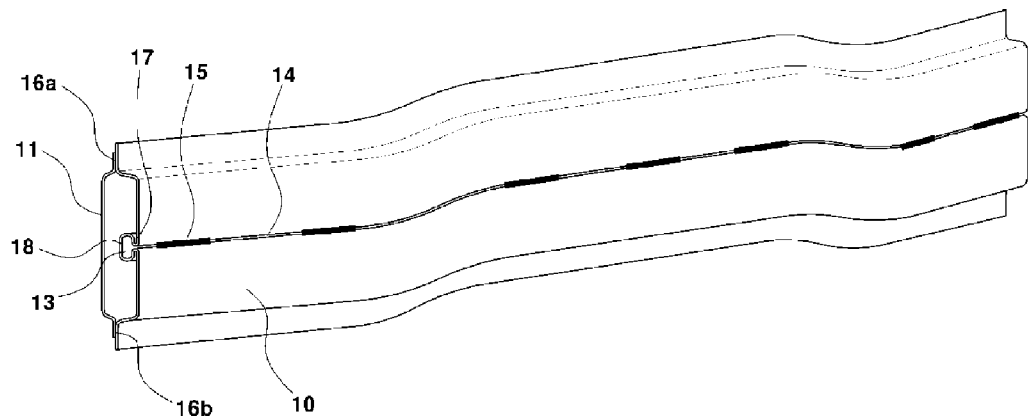
FIG. 2 is a perspective view illustrating an exemplary bumper rail for a vehicle according to the present invention.
Figure 3A:
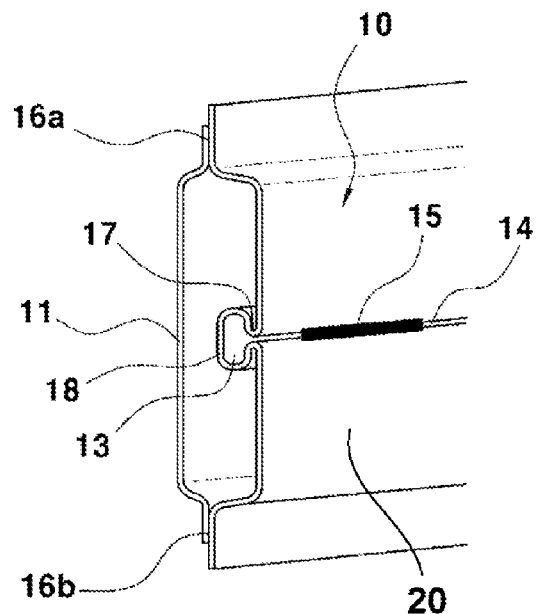
FIGS. 3A and 3B are a magnified view and a cross-sectional view, respectively, illustrating an exemplary bumper rail for a vehicle according to the present invention.
Figure 3B:
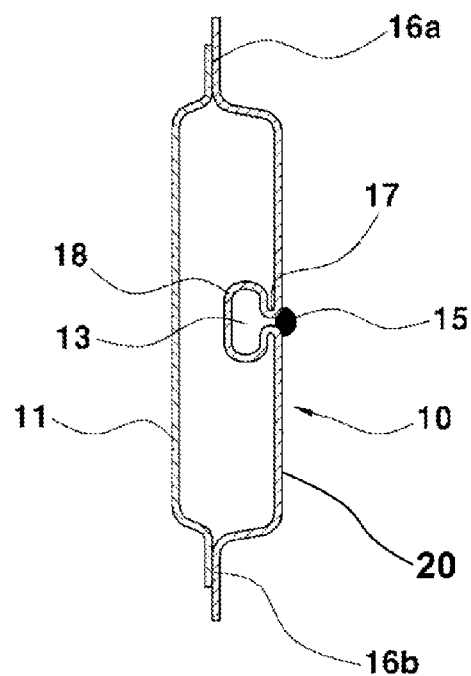

FIG. 2 is a perspective view illustrating a bumper rail for a vehicle according to various embodiments of the present invention. FIGS. 3A and 3B are a magnified view and a cross-sectional view, respectively, illustrating a bumper rail for a vehicle according to various embodiments of the present invention.

As shown in FIGS. 2, 3A and 3B, the bumper rail, for example, the front bumper rail may secure stiffness thereof without a separate steel pipe, by integrally forming an additional pipe during the rail roll-forming.

For this, a bumper rail 10 and a reinforcing member 11 may be disposed at the front side and the rear side, respectively, and may form a closed section through joints 16a and 16b on the upper and lower sides. Particularly, a forming part 18 having a pipe shape may be integrally and/or monolithically formed inside the bumper rail.

The forming part 18 may be formed by roll-forming a portion the vertical wall of the bumper rail 10, and may be formed in a pipe shape having a circular, oval, or rectangular section. The forming part 18 may be disposed parallel along the longitudinal direction of the bumper rail 10.

For example, the forming part 18 may be formed along the center of the vertical wall 20 of the bumper rail 10 by forming a neck 17 bent to the inside of the closed section of the bumper rail 10 and the reinforcing member 11 and extending from a gap 14. The forming part 18 may have a hollow 13 extending from the neck 17 to form a pipe shape.

The forming part 18 having the pipe shape may be formed in concurrence with the rail forming by integrally and/or monolithically forming the neck 17 on the vertical wall of the bumper rail 10.

As the forming part 18 is integrally and/or monolithically formed at the inner side of the bumper rail 10 through the neck 17, the gap 14 having a uniform interval may be formed in the vertical wall of the bumper rail 10 along the longitudinal direction of the bumper rail 10.

For example, a plurality of joints 15, e.g., $CO_2$-welding portions may be formed at a certain interval along the gap 14 in the vertical wall of the bumper rail 10. The joints 15 may join the upper part and the lower part of the vertical wall so as to allow the forming part 18 to enhance the stiffness of the vertical wall of the bumper rail 10.

The forming part 18 may be disposed in plurality on the bumper rail 10. When the stiffness of the bumper rail is additionally needed, the number of the forming parts 18 may increase.

Thus, since the number of the forming parts 18 integrally and/or monolithically formed in a pipe shape can be additionally formed during the roll-forming of the front bumper rail, and the gap formed by the roll-forming is $CO_2$-welded to achieve the bumper rail reinforced structure, it is possible to achieve a stiffness equal to that of a typical steel pipe welding type in preparation for the low-speed crash and the offset crash of vehicles, and cost, weight, and man-hour for assembling can be reduced due to the omission of the steel pipe.

A bumper rail for a vehicle according to various embodiments of the present invention has the following advantages.

First, cost and weight can be reduced by omission of a steel pipe.

Second, since a pipe assembly jig can be omitted due to the omission of the steel pipe upon assembling of the bumper rail, man-hour can be saved.

Third, since a plurality of forming parts having a pipe shape can be integrally formed to further increase the stiffness of the rail bumper, it is possible to actively cope with crash.

Fourth, since the stiffness of the bumper rail can be secured while maintaining the shape of an existing bumper rail, the bumper rail is advantageous in terms of structure and space utilization.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper rail apparatus assembled into a bumper of a vehicle, comprising:
   a bumper rail including:
      a vertical wall part;
      a neck part monolithically formed in the vertical wall part and inwardly protruding from the vertical wall part; and
      a forming part monolithically formed in the neck part of the bumper rail and disposed parallel along a longitudinal direction of the bumper rail to increase stiffness of the bumper rail, the forming part having a pipe shape; and a reinforcing member disposed at a rear side of the bumper rail and forming a closed section together with the bumper rail.

2. The bumper rail apparatus of claim 1, wherein the forming part having the pipe shape has a hollow therein and the neck part forms a gap in the vertical wall part of the bumper rail.

3. The bumper rail apparatus of claim 2, further comprising a plurality of joints formed at intervals along the gap in the vertical wall part of the bumper rail.

4. The bumper rail apparatus of claim 1, wherein the forming part having the pipe shape is disposed along a center of the vertical wall part of the bumper rail.

5. The bumper rail apparatus of claim 1, wherein the forming part having the pipe shape is disposed in plurality to further increase the stiffness of the bumper rail.

6. The bumper rail apparatus of claim 2, further comprising a plurality of joints formed at intervals along the gap in the vertical wall part of the bumper rail.

7. The bumper rail apparatus of claim 2, wherein the forming part having the pipe shape is disposed along a center of the vertical wall part of the bumper rail.

8. The bumper rail apparatus of claim 2, wherein the forming part having the pipe shape is disposed in plurality to further increase the stiffness of the bumper rail.

\* \* \* \* \*